US012664255B2

(12) United States Patent
Chechik et al.

(10) Patent No.: US 12,664,255 B2
(45) Date of Patent: Jun. 23, 2026

(54) PREVENTING EDR TERMINATION USING VULNERABLE DRIVERS

(71) Applicant: PALO ALTO NETWORKS (ISRAEL ANALYTICS) LTD., Tel Aviv (IL)

(72) Inventors: Or Chechik, Rishon LeZion (IL); Ori Damari, Ramat Gan (IL); Yaron Samuel, Ramat Gan (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 28 days.

(21) Appl. No.: 18/676,573

(22) Filed: May 29, 2024

(65) Prior Publication Data

US 2025/0371130 A1 Dec. 4, 2025

(51) Int. Cl.
*G06F 21/56* (2013.01)
*G06F 21/51* (2013.01)

(52) U.S. Cl.
CPC .............. *G06F 21/51* (2013.01); *G06F 21/56* (2013.01)

(58) Field of Classification Search
CPC .......... G06F 21/51; G06F 21/56; G06F 21/54; G06F 21/566; G06F 21/554
See application file for complete search history.

(56) References Cited

U.S. PATENT DOCUMENTS

| | | | |
|---|---|---|---|
| H2196 H | 7/2007 | Tester | |
| 7,950,057 B1 * | 5/2011 | Kennedy | G06F 21/53 713/193 |
| 8,205,257 B1 | 6/2012 | Satish et al. | |
| 8,601,584 B1 * | 12/2013 | Lu | G06F 21/54 719/313 |
| 8,640,235 B2 | 1/2014 | Repasi et al. | |
| 8,646,076 B1 | 2/2014 | Lim et al. | |
| 8,990,944 B1 | 3/2015 | Singh et al. | |
| 9,659,182 B1 | 5/2017 | Roundy et al. | |
| 10,193,918 B1 | 1/2019 | Patton et al. | |

(Continued)

FOREIGN PATENT DOCUMENTS

| | | |
|---|---|---|
| CN | 115033879 A | 9/2022 |
| JP | 2010-509654 A | 3/2010 |

(Continued)

OTHER PUBLICATIONS

1 International Application # PCT/US2025/016969 Search Report dated Apr. 22, 2025.

(Continued)

*Primary Examiner* — Amie C. Lin
(74) *Attorney, Agent, or Firm* — Meitar Patents LTD.; Daniel Kligler

(57) ABSTRACT

Methods, storage systems and computer program products implement embodiments of the present invention that include deploying, in a memory used by an operating system kernel of a computer, a hooked version of a syscall that is configured to modify an execution status of processes executing on the computer. Subsequent to one or more protected processes being specified, a notification of a call to the syscall from the hooked version of the syscall is received, the call requesting to change the execution status of a given process executing on the computer. Finally, upon ascertaining that the given process is one of the protected processes, execution of the syscall is inhibited.

18 Claims, 3 Drawing Sheets

(56) References Cited

U.S. PATENT DOCUMENTS

| | | | |
|---|---|---|---|
| 10,409,981 B2 | 9/2019 | Iyengar et al. | |
| 10,503,904 B1 | 12/2019 | Singh et al. | |
| 10,860,718 B2 | 12/2020 | Seetharamaiah et al. | |
| 11,216,559 B1 | 1/2022 | Gu et al. | |
| 11,409,868 B2 | 8/2022 | Reid et al. | |
| 11,520,886 B2 | 12/2022 | Levy et al. | |
| 11,886,585 B1 | 1/2024 | Davis | |
| 11,934,801 B2 | 3/2024 | Rahmani et al. | |
| 12,223,044 B1 | 2/2025 | Jung et al. | |
| 2004/0049693 A1 | 3/2004 | Douglas | |
| 2005/0091558 A1 | 4/2005 | Chess et al. | |
| 2006/0143707 A1 | 6/2006 | Song et al. | |
| 2008/0040800 A1 | 2/2008 | Park | |
| 2009/0049550 A1* | 2/2009 | Shevchenko | G06F 21/52 |
| | | | 726/23 |
| 2012/0047515 A1* | 2/2012 | Kanetomo | G06F 9/4843 |
| | | | 718/107 |
| 2012/0255004 A1* | 10/2012 | Sallam | G06F 21/554 |
| | | | 726/23 |
| 2014/0115652 A1 | 4/2014 | Kapoor et al. | |
| 2015/0213260 A1 | 7/2015 | Park | |
| 2015/0215335 A1 | 7/2015 | Giuliani et al. | |
| 2016/0055337 A1 | 2/2016 | El-Moussa | |
| 2016/0232347 A1 | 8/2016 | Badishi | |
| 2017/0180421 A1 | 6/2017 | Shieh et al. | |
| 2018/0068115 A1 | 3/2018 | Golovkin et al. | |
| 2018/0115577 A1 | 4/2018 | Shukla et al. | |
| 2018/0189490 A1 | 7/2018 | Maciejak et al. | |
| 2018/0191779 A1 | 7/2018 | Shieh et al. | |
| 2018/0211038 A1 | 7/2018 | Breiman et al. | |
| 2018/0248896 A1 | 8/2018 | Challita et al. | |
| 2019/0087572 A1 | 3/2019 | Ellam et al. | |
| 2019/0109870 A1 | 4/2019 | Bedhapudi et al. | |
| 2019/0121978 A1 | 4/2019 | Kraemer et al. | |
| 2019/0138727 A1 | 5/2019 | Dontov et al. | |
| 2019/0318090 A1 | 10/2019 | Sandoval et al. | |
| 2019/0325133 A1 | 10/2019 | Goodridge et al. | |
| 2019/0347418 A1 | 11/2019 | Strogov et al. | |
| 2020/0089876 A1 | 3/2020 | Aharoni et al. | |
| 2020/0106808 A1 | 4/2020 | Schutz et al. | |
| 2020/0183820 A1 | 6/2020 | Hebert et al. | |
| 2020/0204589 A1 | 6/2020 | Strogov et al. | |
| 2020/0342100 A1 | 10/2020 | Goldstein et al. | |
| 2021/0152595 A1 | 5/2021 | Hansen et al. | |
| 2022/0222338 A1 | 7/2022 | Gupta | |
| 2022/0284095 A1 | 9/2022 | Ahmed | |
| 2023/0084691 A1 | 3/2023 | Levy et al. | |

FOREIGN PATENT DOCUMENTS

| | | |
|---|---|---|
| JP | 2015141718 A | 8/2015 |
| KR | 20090088198 A | 8/2009 |
| KR | 20100078081 A | 7/2010 |
| KR | 20120031745 A | 4/2012 |
| KR | 20120126667 A | 11/2012 |
| RU | 2012113963 A | 10/2013 |
| WO | 2008056944 A1 | 5/2008 |
| WO | 2022109664 A1 | 6/2022 |
| WO | 2022248920 A1 | 12/2022 |
| WO | 2023133582 A1 | 7/2023 |

OTHER PUBLICATIONS

Frohoff, "A Proof-of-Concept Tool for Generating Payloads that Exploit unsafe Java Object Deserialization," github.com, pp. 1-3, Jul. 16, 2022, as downloaded from https://github.com/frohoff/ysoserial.

Wikipedia, "Return-oriented Programming," pp. 1-6, last edited Mar. 31, 2020, as downloaded from https://web.archive.org/web/20200403142512/https://en.wikipedia.org/wiki/Return-oriented_programming.

McNab, "Network Security Assessment", 2nd edition, Chapter 16 (Exploitation Frameworks), pp. 393-414, Oct. 2007.

Balakrishnan, "Understanding Java Agents," Tutorial, pp. 1-8, Jul. 6, 2020, as downloaded from https://dzone.com/articles/java-agent-1.

Wilson, "Windows Inline Function Hooking," Blog Entry, LRQA Nettitude, pp. 1-11, Mar. 18, 2015, as downloaded from https://blog.nettitude.com/uk/windows-inline-function-hooking.

Palo Alto Networks, "Cortex XDR," Datasheet, pp. 1-9, year 2023.

U.S. Appl. No. 17/979,004 Office Action dated Jun. 6, 2024.

Chechik et al., U.S. Appl. No. 18/301,366, filed Apr. 17, 2023.

Chechik et al., U.S. Appl. No. 18/676,573, filed May 29, 2024.

Aharoni et al., U.S. Appl. No. 18/779,134, filed Jul. 22, 2024.

U.S. Appl. No. 17/979,004 Office Action dated Sep. 6, 2024.

AU Application # 2021447019 Office Action dated Sep. 16, 2024.

Blackberry, "Threat Spotlight: Petya-Like Ransomware is Nasty Wiper", pp. 1-22, Nov. 7, 2017, as downloaded from https://blogs.blackberry.com/en/2017/07/threat-spotlight-petya-like-ransomware-is-nasty-wiper.

Wikipedia, "Java Virtual Machine," pp. 1-8, last update Oct. 25, 2022.

Cristalli et al., "Trusted Execution Path for Protecting Java Applications Against Deserialization of Untrusted Data," Proceedings, International Conference, ICB 2007—Advances in Biometrics, Springer Nature Switzerland AG, pp. 445-464, year 2018.

Wikipedia, "Java Remote Method Invocation," pp. 1-4, last edited Dec. 26, 2020.

Wikipedia, "Metasploit Project," pp. 1-7, last edited Jun. 7, 2022.

Cynet, "Cobalt Strike: White Hat Hacker Powerhouse in the Wrong Hands," pp. 1-6, last updated Jun. 27, 2022, as downloaded from https://web.archive.org/web/20220627023847/https://www.cynet.com/network-attacks/cobalt-strike-white-hat-hacker-powerhouse-in-the-wrong-hands/.

Shah, "Analyzing CVE-2017-9791: Apache Struts Vulnerability Can Lead to Remote Code Execution,", McAfee, pp. 1-7, Jul. 19, 2017, as downloaded from https://www.mcafee.com/blogs/other-blogs/mcafee-labs/analyzing-cve-2017-9791-apache-struts-vulnerability-can-lead-remote-code-execution/.

Bauman et al, "Renewable Just-In-Time Control-Flow Integrity", Proceedings of the 26th International Symposium On Research in Attacks, Intrusions and Defenses, Oct. 16, 2023 (Oct. 16, 2023), pp. 580-594, https://dl.acm.org/doi/pdf/10.1145/3607199.3607239.

PCT International Search Report and Written Opinion for international application No. PCT/US2025/035110, dated Oct. 8, 2025.

Notice of References Cited, U.S. Appl. No. 18/789,764, dated Dec. 3, 2025.

JP Office Action, Patent Application No. 2023-572867 dated Jan. 7, 2025.

JP Notice of Allowance, JP Patent Application No. 2023-572867 dated Mar. 4, 2025.

Non-final Office Action, U.S. Appl. No. 18/789,764, dated Dec. 3, 2025.

Notice of References Cited, U.S. Appl. No. 18/779,134, dated Oct. 23, 2025.

Non-Final Office Action, U.S. Appl. No. 18/779,134, dated Oct. 23, 2025.

* cited by examiner

PREVENTING EDR TERMINATION USING VULNERABLE DRIVERS

FIELD OF THE INVENTION

The present invention relates generally to computer security, and particularly preventing termination of specific processes during a bring your own vulnerable drivers (BYOVD) cyberattack.

BACKGROUND OF THE INVENTION

A rootkit attack is an example of a cyberattack that employs vulnerable drivers. In cyberattacks leveraging vulnerable drivers, also known as bring your own vulnerable drivers (BYOVD) cyberattacks, malicious actors exploit weaknesses in device drivers or system components in order to gain unauthorized access and control over a targeted computer system. These attacks may begin with the exploitation of known vulnerabilities within the operating system or device drivers themselves. Attackers can craft specially designed payloads or malware that exploit these vulnerabilities, enabling them to execute arbitrary code with elevated privileges on the system. Once the vulnerable driver is compromised, the attacker can then use it as a conduit to inject their malicious code directly into the kernel or operating system, effectively bypassing traditional security measures.

Once the malicious drivers are installed and running on the compromised system, the rootkit gains a foothold, allowing attackers to conceal their presence and carry out further malicious activities undetected. These activities may include stealing sensitive information, monitoring user activities, or remotely controlling the compromised system. Because rootkits operate at such a low level within the operating system, they can evade detection by many antivirus and security tools, making them particularly insidious threats. Detecting and mitigating rootkit attacks involving vulnerable drivers often requires a combination of advanced security measures, including regular software updates, intrusion detection systems, and specialized anti-rootkit tools capable of identifying and removing malicious drivers from the system.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method for protecting a computer, including deploying, in a memory used by an operating system kernel of the computer, a hooked version of a syscall that is configured to modify an execution status of processes executing on the computer, specifying one or more protected processes, receiving, from the hooked version of the syscall, a notification of a call to the syscall requesting to change the execution status of a given process executing on the computer, and upon ascertaining that the given process is one of the protected processes, inhibiting execution of the syscall.

In one embodiment, deploying the hooked version of the syscall includes injecting, into the syscall, program instructions that are configured to convey the notification in response to the call to the syscall.

In another embodiment, wherein the syscall is configured to modify an execution status of a given process by terminating execution of the given process.

In some embodiments, the given process includes one or more threads, and wherein the syscall is configured to modify an execution status of a given process by terminating execution of a given thread.

In an additional embodiment, the syscall is configured to modify an execution status of a given process by suspending execution of the given process.

In some embodiments, the given process includes one or more threads, and wherein the syscall is configured to modify an execution status of a given process by suspending execution of a given thread.

In a further embodiment, wherein the syscall is configured to modify an execution status of a given process by closing a handle of the given process.

In a supplemental embodiment, wherein the syscall is configured to manipulate a registry key for a software application executing on the computer.

In some embodiments, wherein the software application includes a security software application.

In a first driver embodiment, the memory includes multiple drivers, and the method further includes identifying a given driver that called the syscall, and inhibiting execution of the identified driver.

In a second driver embodiment, the drivers include respective load dates, and wherein identifying the given driver includes identifying that the given driver has a most recent load date.

In a third driver embodiment, the method further includes identifying a given process that loaded the driver to the memory, and inhibiting execution of the identified process.

In a fourth driver embodiment, the given driver called the syscall in response to a request the given driver received from a given process, and the method further includes identifying the given process, and inhibiting execution of the given process.

In one embodiment, the steps of deploying, specifying, receiving, ascertaining and inhibiting are performed by an endpoint agent executing on the computer.

In another embodiment, the specified process belongs to a security software application executing on the computer.

In some embodiments, security software includes an endpoint agent.

There is also provided, in accordance with an embodiment of the present invention, a computer, including a memory and a processor configured to deploy, in the memory used by an operating system kernel of the computer, a hooked version of a syscall that is configured to modify an execution status of processes executing on the computer, to specifying one or more protected processes, to receive, from the hooked version of the syscall, a notification of a call to the syscall requesting to change the execution status of a given process executing on the computer, and upon ascertaining that the given process is one of the protected processes, to inhibit execution of the syscall.

There is additionally provided, in accordance with an embodiment of the present invention, a computer software product for protecting a computer, the computer software product including a non-transitory computer-readable medium, in which program instructions are stored, which instructions, when read by the computer, cause the computer to deploy, in a memory used by an operating system kernel of the computer, a hooked version of a syscall that is configured to modify an execution status of processes executing on the computer, to specify one or more protected processes, to receive, from the hooked version of the syscall, a notification of a call to the syscall requesting to change the execution status of a given process executing on the computer, and upon ascertaining that the given process is one of the protected processes, to inhibit execution of the syscall.

BRIEF DESCRIPTION OF THE DRAWINGS

The disclosure is herein described, by way of example only, with reference to the accompanying drawings, wherein.

DETAILED DESCRIPTION OF EMBODIMENTS

In some bring your own vulnerable drivers (BYOVD) cyberattacks, syscalls (i.e., system calls) are leveraged in order to exploit a vulnerable driver. In these BYOVD cyberattacks, malicious actors can use system call requests to interact with the vulnerable driver and exploit weaknesses within its code or configurations. By leveraging syscalls to the compromised driver, attackers can execute arbitrary code within the kernel, enabling them to gain escalated privileges and establish persistent control over the targeted system. This technique allows attackers to evade traditional security measures and conduct various malicious activities, such as installing additional malware, exfiltrating sensitive data, or tampering with system functionalities, all while maintaining stealth and resilience against detection and removal efforts.

In the present description and in the claims, the term "syscall" refers to a function (typically in a kernel space of a memory), and the term "call to a syscall" refers to a call to the function.

Embodiments of the present invention provide methods and systems for protecting a computer. As described hereinbelow, the computer is initialized by deploying, in a memory used by an operating system kernel of the computer, a hooked version of a syscall that is configured to modify an execution status of processes executing on the computer, and identifying one or more protected processes. In some embodiments, the protected processes may "belong" to a cybersecurity application such as an endpoint security agent.

Subsequent to initializing the computer, a notification of a call to the syscall requesting to change the execution status of a given process executing on the computer is received (e.g., by the endpoint security agent) from the hooked version of the syscall. Finally, upon ascertaining that the given process is one of the protected processes, execution of the syscall can be inhibited.

System Description

Figure 1:
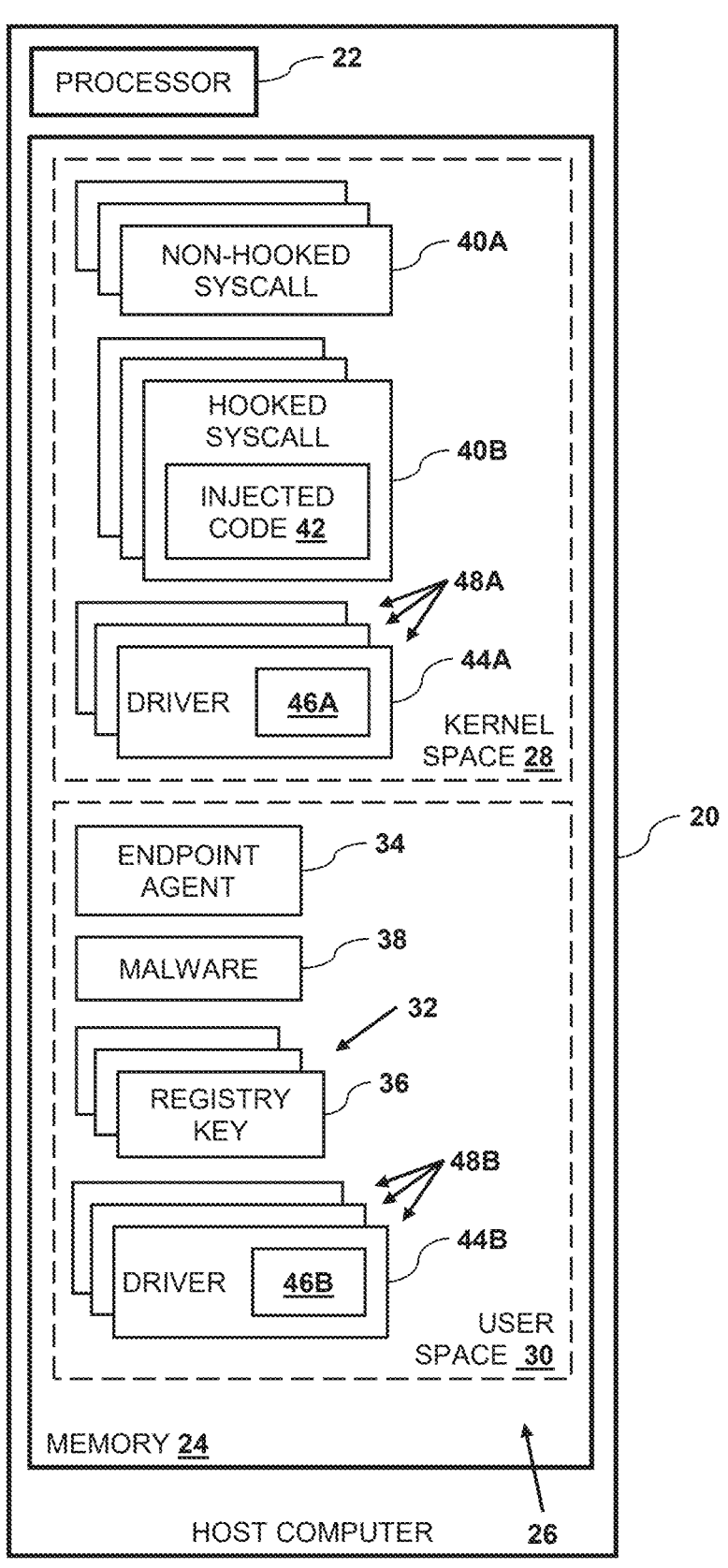
FIG. 1 is a block diagram showing an example of a host computer executing, from a memory, an endpoint security agent configured to detect and prevent bring your own vulnerable drivers (BYOVD) cyberattacks, in accordance with an embodiment of the present invention.

FIG. 1 is a block diagram that shows hardware and software components of a host computer 20, in accordance with an embodiment of the present invention. In the configuration shown in FIG. 1, host computer 20 comprises a processor 22 and a memory 24 that stores an operating system 26. When executing operating system 26 from memory 24, processor 22 can partition the memory into a kernel space 28 (also known as a kernel mode or a kernel memory) and a user space 30 (also known as a user mode or a user memory).

User space 30 refers to a region in memory 24 where user processes run. User space 30 is typically isolated from kernel space 28 and other processes for security and stability purposes. User space 30 may comprise a registry 32 and an endpoint agent 34. Endpoint agent 34 is also known as an endpoint detection and response (EDR) application.

Registry 32 comprises a set of registry keys 36 that stores configuration settings and options for the operating system, hardware, and installed software. Examples of information stored in registry keys 36 include, but are not limited to, user preferences, system settings, device configurations, and application settings.

Endpoint agent 34 (also known as an endpoint security agent or a security agent) comprises a software application that processor 22 can execute (typically in the background) in order to detect, and prevent security threats, such as malware, unauthorized access, and data breaches. One example of endpoint security agent 34 is CORTEX XDR™ produced by PALO ALTO NETWORKS INC., 3000 Tannery Way, Santa Clara, CA 95054 USA).

In embodiments herein, user space 30 also comprises a malware application 38. In some embodiments, processor 22 can inadvertently (e.g., via a phishing attack) load malware application 38 into user space 30, and the malware can be configured to launch a cyberattack such as a BYOVD cyberattack.

Kernel space 28 is a privileged area in memory 24 where the operating system's core components reside, and comprises system calls (syscalls) 40 that are configured to perform tasks such as managing devices and memory 24. Kernel space 28 operates at a higher privilege level than user space 30 so as to enable processor 22 to directly access hardware resources and to execute privileged instructions.

In the example shown in FIG. 1, syscalls 40 can be differentiated by appending a letter to the identifying numeral, so that the syscalls comprise non-hooked syscalls 40A and hooked syscalls 40B. Non-hooked syscalls 40A comprise syscalls 40 for operating system 26 that were not modified using embodiments described herein.

In embodiments herein, each given hooked syscall 40B comprise a given syscall 40 that endpoint agent 34 modifies by injecting code 42 (also referred to herein as injected code 42) comprising program instructions that processor 22 can execute upon calling the given syscall. An example of an operation performed by injected code 42 is described hereinbelow. Hooked syscalls 40B are also known as hotpatched syscalls, monkeypatched syscalls and interposed syscalls.

Memory 24 also comprises a plurality of drivers 44. Drivers 44 comprise software applications that operating system 26 can use for controlling physical hardware devices (e.g., a physical storage device), virtual device drivers that the operation system can use to emulate hardware devices for virtual machines, and software device drivers that the operating system can use to emulates functionality of a hardware device using software.

In the configuration shown in FIG. 1, each given driver 44 comprises an application program interface (APIs) 46 that can be used to access the given driver. Additionally, each given driver 44 has a date 46 indicating a date and time when processor 22 loaded the given driver to memory 24.

In embodiments herein, drivers 44 and their respective components can be differentiated by appending a letter to the identifying numeral, so that the drivers comprise drivers 44A comprising respective APIs 46A and dates 48A (i.e., for APIs 46A), and drivers 44B comprising respective APIs 46B and dates 48B (i.e., for APIs 46A). In these embodiments, processor 22 executes drivers 44A from kernel space 28, and executes drivers 44B from user space 30.

Figure 2:
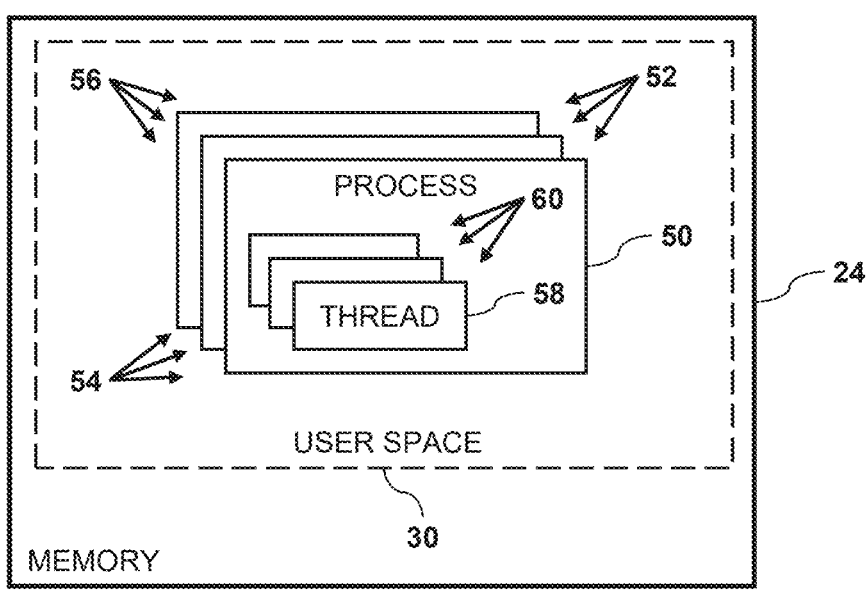
FIG. 2 is a block diagram showing details of processes executing in the memory of the host computer, in accordance with an embodiment of the present invention.

FIG. 2 is a block diagram showing an example configuration of processes 50 that processor 30 can execute from user space 30 in memory 24, in accordance with an embodiment of the present invention.

In the configuration shown in FIG. 2, processes 50 comprise respective process identifiers (IDs) 52, associated entities 54 and handles 56. Each process 50 typically comprises multiple threads 58 having respective thread IDs 60. Examples of process IDs 52 include process names and computed hash values for their respective processes 50. Likewise, examples of thread IDs 60 include thread names and computed hash values for their respective threads 58.

In some embodiments, endpoint agent 34, malware application 38 and drivers 44B may be referred to collectively as execution entities (i.e., sets of program instructions executing on processor 22). In these embodiments, each of the execution entities comprises one or more processes 50, and each given associated entity 54 for a given process 50 references the execution entity to which the given process "belongs" (e.g., endpoint agent 34 may comprise the given process). As described supra, each process 50 comprises one or more threads 58. Therefore, since processes 50 have respective associated entities 54, processor 22 can identify the respective associated entities for threads 58.

Each handle 56 for a corresponding process 50 comprises a data structure that operating system 26 or other processes 50 can use to manage and control the execution of the corresponding process. Examples of controlling the execution of the corresponding process include terminating or suspending execution of the corresponding process.

Figure 3:
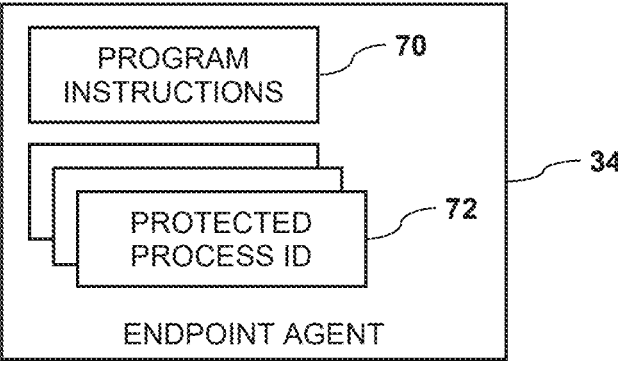
FIG. 3 is a block diagram showing details of the endpoint security agent, in accordance with an embodiment of the present invention.

FIG. 3 is a block diagram showing software and data components of endpoint agent 34, in accordance with an embodiment of the present invention. In the configuration shown in FIG. 3, endpoint agent 34 comprises a set of program instructions 70, that when executed by processor 22, can detect and prevent security threats, as described supra.

In embodiments described herein, endpoint agent 34 also comprises a set of protected process IDs 72. As described hereinbelow, endpoint agent 34 can prevent a cyberattack from modifying an execution status of a given process 50 whose respective process ID 52 matches a given protected process ID 72.

Processor 22 comprises one or more general-purpose central processing units (CPU) or special-purpose embedded processors, which are programmed in software or firmware to carry out the functions described herein. This software may be downloaded to host computer 20 in electronic form, over a network, for example. Additionally or alternatively, the software may be stored on tangible, non-transitory computer-readable media, such as optical, magnetic, or electronic memory media. Further additionally or alternatively, at least some of the functions of processor 22 may be carried out by hard-wired or programmable digital logic circuits.

Examples of memory 24 include dynamic random-access memories and non-volatile random-access memories, hard disk drives and solid-state disk drives.

In some embodiments, tasks described herein performed by processor 22 may be split among multiple physical and/or virtual computing devices. In other embodiments, these tasks may be performed in a managed cloud service.

Process Termination Detection and Prevention

Figure 4:
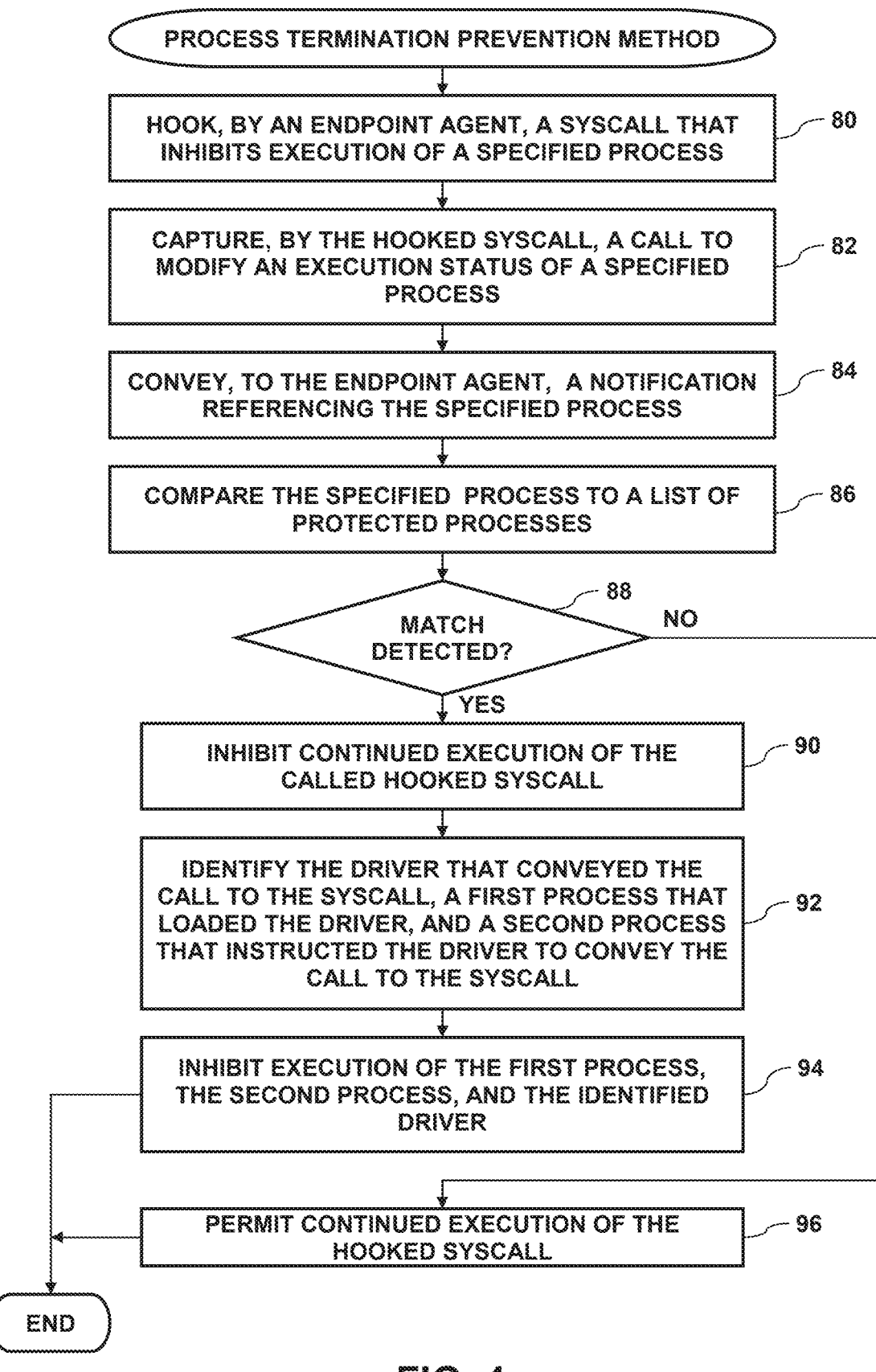
FIG. 4 is a flow diagram that schematically illustrates a method for detecting and preventing BYOVD cyberattacks that attempt to modify an execution status of a specified process, in accordance with an embodiment of the present invention.

FIG. 4 is a flow diagram that schematically illustrates a method for detecting and preventing a process 50 currently executing on processor 22 whose respective process ID matches a given protected process ID 72, in accordance with an embodiment of the present invention.

The description referencing FIG. 4 references a BYOVD attack in a WINDOWS™ environment (i.e., operating system 26 comprises the WINDOWS™ operating system produced by MICROSOFT CORPORATION, One Microsoft Way, Redmond, WA, USA) that includes the following steps:

1. Processor 22 loads and starts executing malware application 38 (e.g., in response to a phishing cyberattack).
2. Malware application 38 downloads, from a website (not shown), a copy of the GMER driver (i.e., a given driver 44A). The GMER driver can be used to remove rootkits and malware (e.g., malware application 38). In this BYOVD cyberattack, the GMER driver comprises a mode that exposes the GMER driver to malware application 38, thereby enabling the malware to request the GMER driver to change an execution status of a given process 50 in user space.
3. Malware application 38 exploits the mode (described in step 2) by calling the WINDOWS™ DeviceIoControl API (not shown) so as to instruct DeviceIoControl to terminate a specified process 50.
4. The GMER driver can then open a given handle 56 to the specified process, and calls ZwTerminateProcess to terminate the specified process. The ZwTerminateProcess syscall is described hereinbelow.

In step 80, endpoint agent 34 (executing on processor 22) "hooks" a given syscall 40 so as to transform the given syscall to a given hooked syscall 40B. In embodiments herein hooking a given syscall may also be referred to as deploying a hooked version of a syscall. As described supra, endpoint agent hooks the given syscall by injecting, into the given syscall, code 42 that processor 22 can execute upon calling the given syscall. In the description hereinbelow, the given hooked syscall is referred to simply as the hooked syscall.

In embodiments herein, the syscall that endpoint agent 34 "hooks" comprises a given syscall 40 that modifies an execution status of a specified process 50. The following are examples of syscalls 40 (used by the WINDOWS™ operating system) that endpoint agent 34 can hook so as to monitor and control requests that modify an execution status of a specified process 50:

ZwSuspendProcess suspends execution of a specified process 50.

ZwTerminateThread terminates execution of a specified thread 58.

ZwTerminateProcess terminates execution of a specified process 50.

Zwclosehandle closes a specified open (object) handle 56, thereby causing the specified handle to become invalid.

Zwopenkey opens, for the caller (i.e., of this syscall 40), a specified handle 56 that to a given registry key 36. Manipulating one or more registry keys 36 enables an attacker to alter the configuration of host computer 20.

For example, the attacker can manipulate one or more registry keys 36 in order to disable a security software application (e.g., an antivirus application or endpoint agent 34). In this example, an attack may comprise manipulating the registry keys so as to remove service entries from kernel space 28, and then forcing a reboot of host computer 20. Manipulation of the registry keys can prevent host computer 20 from loading the security software application software upon rebooting.

As noted by these examples, syscalls 40 that endpoint agent 34 can hook can modify an execution status of a specified process 50 by suspending execution of the specified process, suspending execution a given thread 58 of the specified process, terminating execution of the specified process, terminating execution of a given thread 58 of the specified process, closing a given handle 56 of the specified process, or manipulating a specified registry key 36.

In step 82, injected code 42 in the hooked syscall captures a call to modify an execution status (e.g., terminate execution) of a specified process 50 currently executing on processor 22. In some embodiments, the call to modify the execution status of the specified process may comprise a call to modify the execution status of a given thread 58.

In step 84, injected code 42 in the hooked syscall identifies process ID 52 for the specified process, and (generates and) conveys, to endpoint agent 34, a notification comprising (i.e., referencing) the identified process ID. As described supra, the captured call may comprise a request to modify the execution status of a given thread 58. In a first alternative notification embodiment, if the captured call comprises a request to modify the execution status of a given thread 58, then the notification may comprise the respective thread ID for the given thread. In a second alternative notification embodiment, if the captured call comprises a request to modify the execution status of a given thread 58, then injected code in the hooked syscall can identify a given process 50 to which the given thread belongs, and the notification comprises the respective process ID for the identified process.

In step 86, endpoint agent 34 receives the notification, and compares the conveyed process ID to protected process IDs 72. As described supra, the conveyed notification comprises a given thread ID. In a first alternative comparison embodiment, endpoint agent 34 can identify the thread corresponding to the thread ID, identify the process to which the identified thread belongs, and compare process ID for the identified process to process IDs 72.

In a second alternative comparison embodiment, protected process IDs 72 may reference both processes 50 and threads 58. In this embodiment, endpoint agent 34 can compare the conveyed thread ID in the received notification to protected process IDs 72.

In step 88, endpoint agent 34 detects if there is a match between the received ID (i.e., the process ID or the thread ID in the received notification) and any protected process ID 72. In some embodiments, protected process IDs 72 may reference processes 50 and/or threads 58 of a security software application such as endpoint agent 34. Other types of security software applications whose respective processes 50 and threads 58 can be referenced by protected process IDs 50 include, but are not limited to, antivirus applications, firewall applications, intrusion detection applications and data loss prevention applications.

If endpoint agent 34 detects a match in step 88, then in step 90, the endpoint agent inhibits continued execution of the (called) hooked syscall. For example, if the captured call comprises a request to terminate the specified process, then inhibiting continued execution of the hooked syscall prevents the hooked syscall from terminating the specified process.

In step 92, endpoint agent 34 identifies a given driver 44A that conveyed the call to the hooked syscall, a first process 50 (i.e., executing on processor 22) that loaded the given driver, and a second process 50 that conveyed a request (e.g., a call to API 46A of the given driver to change the execution status of the specified process. In some embodiments, the first and the second processes 50 may comprise a single process 50. In the example described supra, the identified driver is the GMER driver, the first process loads the GMER driver to memory 24, and in response the second process calling the GMER driver, the GMER driver calls ZwTerminateProcess to terminate the specified process.

To identify the given process that loaded the given driver, endpoint agent 34 can analyze recent events revolving around loading drivers 44, service creation of kernel drivers 44, dropping of driver files (i.e., a ".sys" file), and creation of registry keys 36 for the given driver, and then (search for and) identify a given process 50 responsible for these operations and/or events.

If operating system 26 comprises WINDOWS™, then endpoint agent 34 can identify the second process as follows: A given process 50 (i.e., in user space 30) calls hooked syscall ZwTerminateProcess (i.e., a given hooked syscall 40B). Since most of the termination in the driver that called ZwTerminateProcess is a synchronous operation (i.e., the context of given process does not change from user space 30 to kernel space 28, endpoint agent 34 can identify the second process via the process ID 52 of the process currently executing on processor 22.

In one embodiment, endpoint agent 34 can identify the given driver by identifying, based on load date 48A, that the given driver is the driver (i.e., of all drivers 44A in kernel space 28) that processor 22 most recently loaded to memory 24 prior to the call to the hooked syscall. For example, if operating system 26 comprises WINDOWS™, endpoint agent can identify the given driver by analyzing recent calls to syscalls 40 such as:

CreateService: defines a service (not shown) in operating system 26 that uses the given driver.

CreateFileW:—stores a driver file (not shown) for the given driver to a storage device (not shown) coupled to computer 20.

RegCreateKey: creates a new registry key 36 processor 22 used to install the service.

Finally, in step 94, endpoint agent 34 inhibits execution of the identified driver and the identified first and second processes, and the method ends. In some embodiments, inhibiting the execution of the identified driver and/or inhibiting continued execution of the (called) hooked syscall may comprise generating an alert detailing the attempted cyberattack and the measures that the endpoint agent performed (i.e., in step 94) so as to prevent the cyberattack.

Returning to step 88, if endpoint agent 34 does not detect a match between the received ID (i.e., the process ID in the received notification or the received thread ID in the received notification) and any protected process ID 72, then in step 96, the endpoint agent can convey, to injected code 42 in the hooked syscall, a notification to permit continued execution of the hooked syscall (i.e., to all inhibiting execution of the specified process), and the method ends.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for protecting a computer, comprising:

deploying, in a memory of the computer and used by an operating system kernel of the computer, a hooked version of a syscall that is configured to modify an execution status of processes executing on the computer;

specifying one or more protected processes belonging to a security software application executing on the computer;

receiving, from the hooked version of the syscall, a notification of a call to the syscall requesting to change the execution status of a given process executing on the computer by terminating execution of the given process, wherein the hooked version of the syscall comprises injected program instructions configured to generate the notification in response to the call to the syscall; and in response to receiving the notification and upon ascertaining that the given process is one of the protected processes, i) inhibiting execution of the hooked version of the syscall, ii) identifying a given driver that conveyed the call to the syscall, identifying a first process that loaded the given driver to the memory, and identifying a second process that instructed the given driver to call the syscall to terminate the execution of the given process, and iii) inhibiting execution of the identified given driver, the identified first process, and the identified second process.

2. The method according to claim 1, wherein deploying the hooked version of the syscall comprises injecting, into the syscall, program instructions that are configured to convey the notification in response to the call to the syscall.

3. The method according to claim 1, wherein the syscall is configured to modify an execution status of a given process by terminating execution of the given process.

4. The method according to claim 3, wherein the given process comprises one or more threads, and wherein the syscall is configured to modify an execution status of a given process by terminating execution of a given thread.

5. The method according to claim 1, wherein the syscall is configured to modify an execution status of a given process by suspending execution of the given process.

6. The method according to claim 3, wherein the given process comprises one or more threads, and wherein the syscall is configured to modify an execution status of a given process by suspending execution of a given thread.

7. The method according to claim 1, wherein the syscall is configured to modify an execution status of a given process by closing a handle of the given process.

8. The method according to claim 1, wherein the syscall is configured to manipulate a registry key for a software application executing on the computer.

9. The method according to claim 8, wherein the software application comprises a security software application.

10. The method according to claim 1, further comprising inhibiting execution of the identified driver.

11. The method according to claim 10, wherein the memory comprises multiple drivers comprising respective load dates, and wherein identifying the given driver comprises identifying that the given driver has a most recent load date.

12. The method according to claim 10, and further comprising identifying a given process that loaded the driver to the memory, and inhibiting execution of the identified process.

13. The method according to claim 10, wherein the given driver called the syscall in response to a request the given driver received from a given process, and further comprising identifying the given process, and inhibiting execution of the given process.

14. The method according to claim 1, wherein the steps of deploying, specifying, receiving, ascertaining and inhibiting are performed by an endpoint agent executing on the computer.

15. The method according to claim 1, wherein the specified process belongs to a security software application executing on the computer.

16. The method according to claim 15, wherein the security software comprises an endpoint agent.

17. A computer, comprising:

a memory; and a processor configured:

to deploy, in the memory used by an operating system kernel of the computer, a hooked version of a syscall that is configured to modify an execution status of processes executing on the computer, to specify one or more protected processes belonging to a security software application executing on the computer, to receive, from the hooked version of the syscall, a notification of a call to the syscall requesting to change the execution status of a given process executing on the computer by terminating execution of the given process, wherein the hooked version of the syscall comprises injected program instructions configured to generate the notification in response to the call to the syscall, and in response to receiving the notification and upon ascertaining that the given process is one of the protected processes, to i) inhibit execution of the hooked version of the syscall, ii) identify a given driver that conveyed the call to the syscall, identify a first process that loaded the given driver to the memory, and identify a second process that instructed the given driver to call the syscall to terminate the execution of the given process, and iii) inhibit execution of the identified given driver, the identified first process, and the identified second process.

18. A computer software product for protecting a computer, the computer software product comprising a non-transitory computer-readable medium, in which program instructions are stored, which instructions, when read by the computer, cause the computer:

to deploy, in a memory of the computer and used by an operating system kernel of the computer, a hooked version of a syscall that is configured to modify an execution status of processes executing on the computer;

to specify one or more protected processes belonging to a security software application executing on the computer;

to receive, from the hooked version of the syscall, a notification of a call to the syscall requesting to change the execution status of a given process executing on the computer by terminating execution of the given process, wherein the hooked version of the syscall comprises injected program instructions configured to generate the notification in response to the call to the syscall; and in response to receiving the notification and upon ascertaining that the given process is one of the protected processes, to i) inhibit execution of the hooked version of the syscall, ii) identify a given driver that conveyed the call to the syscall, identify a first process that loaded the given driver to the memory, and identify a second process that instructed the given driver to call the syscall to terminate the execution of the given process, and iii) inhibit execution of the identified given driver, the identified first process, and the identified second process.

\* \* \* \* \*